(12) United States Patent
Cooling et al.

(10) Patent No.: US 12,146,534 B2
(45) Date of Patent: Nov. 19, 2024

(54) FLYWEIGHT DAMPER

(71) Applicant: Hamilton Sundstrand Corporation, Charlotte, NC (US)

(72) Inventors: Aaron Cooling, Rockford, IL (US); Glenn C. Lemmers, Jr., Loves Park, IL (US); Joshua A. Lehs, Stillman Valley, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 506 days.

(21) Appl. No.: 17/403,283

(22) Filed: Aug. 16, 2021

(65) Prior Publication Data

US 2022/0341469 A1 Oct. 27, 2022

Related U.S. Application Data

(60) Provisional application No. 63/180,431, filed on Apr. 27, 2021.

(51) Int. Cl.
*F16D 3/14* (2006.01)

(52) U.S. Cl.
CPC ............ *F16D 3/14* (2013.01); *F16D 2300/22* (2013.01)

(58) Field of Classification Search
CPC ............................. F16D 3/14; F16D 2300/22
USPC .................. 188/78, 79, 185, 250 A, 326
See application file for complete search history.

(56) References Cited

U.S. PATENT DOCUMENTS

| | | | |
|---|---|---|---|
| 1,967,446 A | 7/1934 | Meyer | |
| 2,388,900 A * | 11/1945 | Brooksieker | ........ D01H 7/2225 |
| | | | 188/78 |
| 2,480,946 A | 9/1949 | McDowall et al. | |
| 3,841,111 A | 10/1974 | Staudt et al. | |
| 4,752,077 A | 6/1988 | Hoffelner | |
| 8,851,262 B2 | 10/2014 | Engel | |
| 9,746,035 B2 | 8/2017 | Hennebelle et al. | |
| 2007/0074885 A1 | 4/2007 | Aeberhard | |

FOREIGN PATENT DOCUMENTS

| | | |
|---|---|---|
| DE | 8510138 U1 | 5/1993 |
| GB | 792904 A | 4/1958 |
| GB | 2461545 A | 1/2010 |

OTHER PUBLICATIONS

Extended European Search Report for European Application No. 22169302.1; Report Mail Date Nov. 4, 2022 (pp. 1-7).

* cited by examiner

*Primary Examiner* — Greg Binda
(74) *Attorney, Agent, or Firm* — CANTOR COLBURN LLP

(57) ABSTRACT

A vibration damping assembly for use with a second shaft nested within an interior of a first shaft is provided including a collar rotatable with the first shaft, and a cage rotatable with the second shaft and having at least one window formed therein. The collar and the cage are mounted concentrically. At least one damping mechanism is positioned within the at least one window. The at least one damping mechanism includes at least one flyweight and at least one support wedge. The at least one flyweight movable relative to the cage to frictionally engage an adjacent surface of the collar.

11 Claims, 8 Drawing Sheets

FLYWEIGHT DAMPER

CROSS REFERENCE TO RELATED APPLICATIONS

This application claims the benefit of U.S. Provisional Application No. 63/180,431 filed Apr. 27, 2021, the disclosure of which is incorporated herein by reference in its entirety.

BACKGROUND

Embodiments of the present disclosure relate to a component having nested shafts, and more particularly, to a vibration damping assembly for damping torsional vibration of one of the nested shafts.

Many components or systems, such as a drive train or transmission for example, rely on the use of radially nested and coupled shafts to transmit kinetic energy. However, during operation, one of the nested shafts may experience torsional vibration causing the shaft to oscillate relative to the other shaft as the two shafts rotate together about a central axis. Torsional vibration can result in noise generation as well as equipment fatigue. In addition, torsional vibration may cause an undesired fluctuation in the rotational speed of a component being driven by the nested shafts.

BRIEF DESCRIPTION

According to an embodiment, a vibration damping assembly for use with a second shaft nested within an interior of a first shaft is provided including a collar rotatable with the first shaft, and a cage rotatable with the second shaft and having at least one window formed therein. The collar and the cage are mounted concentrically. At least one damping mechanism is positioned within the at least one window. The at least one damping mechanism includes at least one flyweight and at least one support wedge. The at least one flyweight is movable relative to the cage to frictionally engage an adjacent surface of the collar.

In addition to one or more of the features described above, or as an alternative, in further embodiments the at least one window is a plurality of windows.

In addition to one or more of the features described above, or as an alternative, in further embodiments a size and shape of each of the plurality of windows is identical.

In addition to one or more of the features described above, or as an alternative, in further embodiments the plurality of windows is equidistantly spaced about a periphery of the cage.

In addition to one or more of the features described above, or as an alternative, in further embodiments when the vibration damping assembly is stationary, the at least one damping mechanism is loosely mounted within the at least one window In addition to one or more of the features described above, or as an alternative, in further embodiments the at least one flyweight includes a first flyweight and a second flyweight, and the at least one support wedge is interposed between the first flyweight and the second flyweight.

In addition to one or more of the features described above, or as an alternative, in further embodiments a radial thickness of the at least one flyweight is greater than a radial thickness of the at least one support wedge.

In addition to one or more of the features described above, or as an alternative, in further embodiments a radial thickness of the at least one flyweight is equal to a radial thickness of the cage.

In addition to one or more of the features described above, or as an alternative, in further embodiments the cage further comprises: a first annular band; a second annular band axially spaced from the first annular band; and at least one axial connector connecting the first annular band and the second annular band.

In addition to one or more of the features described above, or as an alternative, in further embodiments the at least one window is defined between a first end surface of the first annular band, a second end surface of second annular band, and at least one side surface of the at least one axial connector.

According to an embodiment, a system includes a first shaft rotatable about an axis, a second shaft nested within an interior of the first shaft, the second shaft being rotatably coupled to the first shaft. A vibration damping mechanism is arranged between the first shaft and the second shaft. During rotation of the first shaft and the second shaft about the axis, the at least one damping mechanism is frictionally engaged with the first shaft.

In addition to one or more of the features described above, or as an alternative, in further embodiments the vibration damping mechanism further comprises: a collar rotatable with the first shaft and a cage rotatable with the second shaft and having at least one window formed therein, wherein the collar and the cage are mounted concentrically.

In addition to one or more of the features described above, or as an alternative, in further embodiments the collar is removably connected to the first shaft.

In addition to one or more of the features described above, or as an alternative, in further embodiments the collar is integrally formed with the first shaft.

In addition to one or more of the features described above, or as an alternative, in further embodiments the collar has a first feature and an inner periphery of the first shaft has a second feature, the first feature being configured to cooperate with the second feature when the collar is mounted to the first shaft.

In addition to one or more of the features described above, or as an alternative, in further embodiments during rotation of the first shaft and the second shaft about the axis, the at least one damping mechanism is frictionally engaged with the collar.

In addition to one or more of the features described above, or as an alternative, in further embodiments the at least one damping mechanism further comprises at least one flyweight and at least one support wedge.

In addition to one or more of the features described above, or as an alternative, in further embodiments at least one of the at least one flyweight and the at least one support wedge has a channel-like configuration.

In addition to one or more of the features described above, or as an alternative, in further embodiments the second shaft further comprises an outwardly extending flange, and the at least one damping mechanism is mounted to the flange.

In addition to one or more of the features described above, or as an alternative, in further embodiments the at least one flyweight is movable relative to the second shaft into frictional engagement with the first shaft in response to centrifugal forces generated by rotation of the at least one flyweight about the axis.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

A generator, such as a variable frequency generator (VFG), may be used to rotate a component of a turbomachine, such as a gas turbine engine for example, during start-up of the turbomachine. The generator may be configured to accelerate rotation of the component during start-up of the turbomachine and may continue to drive rotation of the component until the component reaches a desired speed.

Figure 1:
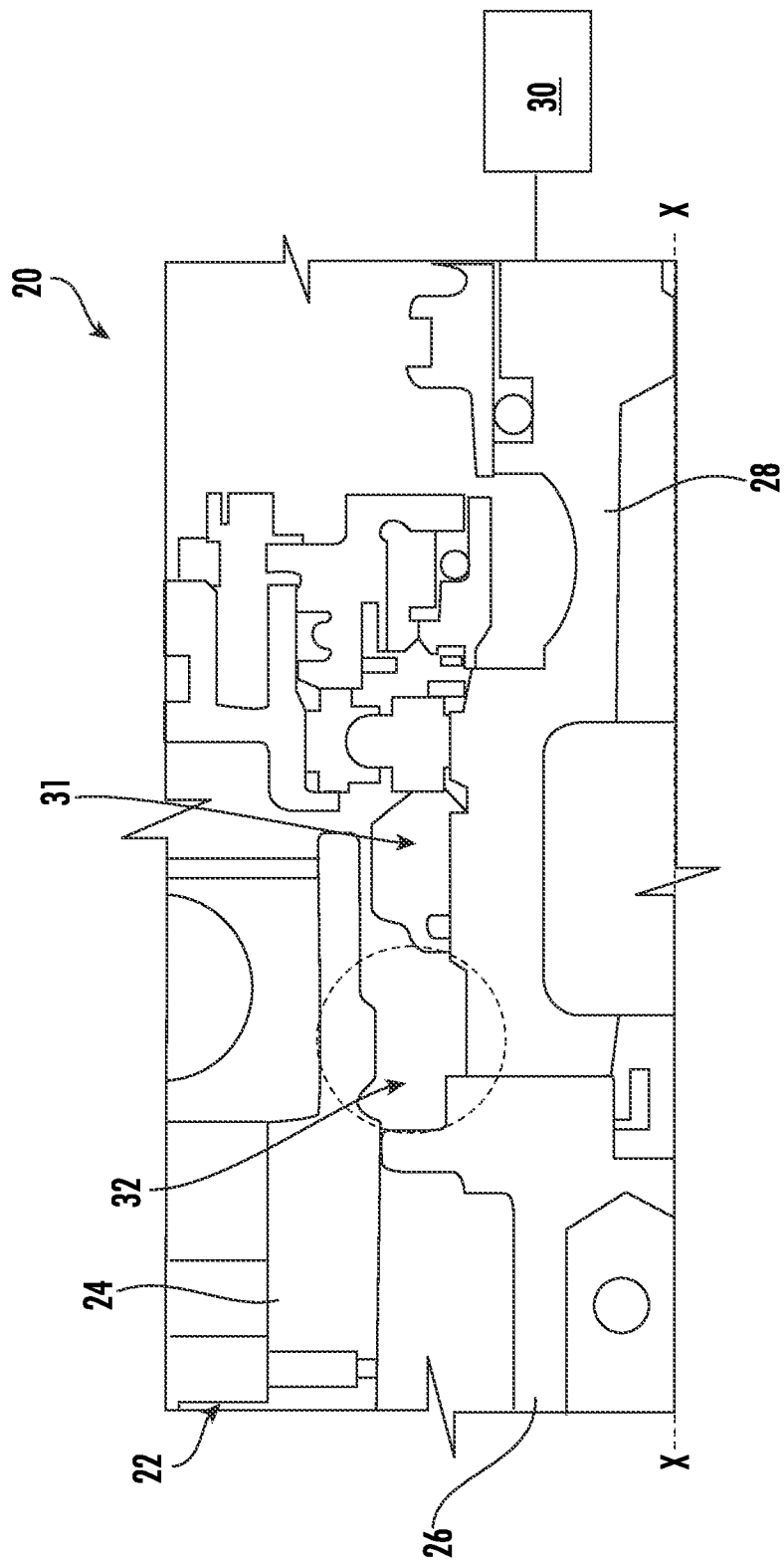
FIG. 1 is a cross-sectional view of a portion of a generator.

Referring now to FIG. 1, a cross-sectional view of an example of a portion of a generator 20 is illustrated. As shown, the generator 20 includes a rotor 22 including a first rotor shaft 24 and a second, drive or disconnect shaft 26 disposed within and movably coupled to the rotor shaft 24. The disconnect shaft 26 defines a longitudinal central axis X of the rotor 22. In an embodiment, the disconnect shaft 26 is operable not only to rotate about the axis X, but also to translate along the axis X. The disconnect shaft 26 and the rotor shaft 24 are rotatably coupled about axis X.

The generator 20 additionally includes an input shaft 28 associated with a gearbox, illustrated schematically at 30. A disconnect assembly 31, such as including a clutch for example, is operable to facilitate engagement and disengagement of the disconnect shaft 26 and the input shaft 28 by translating the disconnect shaft 26 between a first decoupled position and a second coupled position. When in the decoupled position, the disconnect shaft 26 and the rotor shaft 24 are independently rotatable from the input shaft 28. Accordingly, in the decoupled position, rotation of the input shaft 28 is not transferred to the rotor shaft 24. Further, when in a coupled position, the disconnect shaft 26, and therefore the rotor shaft 24, is rotatably coupled with the input shaft 28. When coupled, rotation of the input shaft 28 is transferred to the rotor shaft 24 via the engagement between the input shaft 28 and the disconnect shaft 26.

With reference now to FIGS. 2-7, a portion of the generator 20 proximate an interface of the rotor shaft 24 and the disconnect shaft 26, identified in circle 2 of FIG. 1, is illustrated in more detail. In the illustrated, non-limiting embodiment, a vibration damping assembly 32 is arranged between the rotor shaft 24 and the disconnect shaft 26. The vibration damping assembly 32 may include a collar 34 located at the inner periphery of the rotor shaft 24. Accordingly, the collar 34 is configured to rotate in unison with the rotor shaft 24. With specific reference to FIGS. 2 and 4, the collar 34 has an annular body and may include one or more features that facilitate coupling of the collar 34 to the rotor shaft 24. In such embodiments, the features may have a shape and/or size that is complementary to a corresponding feature formed at the inner periphery of the rotor shaft. In the illustrated, non-limiting embodiment, the collar 34 includes a first plurality of threads, and the rotor shaft 24 includes a second plurality of threads configured to mate with the first plurality of threads. However, it should be understood that the collar 34 may be attached to the rotor shaft 24 via another suitable connection, such as via snap-fit or press-fit connection for example. Further, embodiments where the collar 34 is integrally formed with the rotor shaft 24 are also contemplated herein.

In an embodiment, the collar 34 includes multiple teeth 40 that extend from and are spaced about the periphery of the collar 34 at the first end 42 thereof. Although eleven teeth are illustrated in the FIGS., embodiments having any number of teeth are within the scope of the disclosure. In an embodiment, the configuration of the teeth is selected to cooperate with a tool operable to engage and tighten the threads of the collar to the threads of the rotor shaft. When the collar 34 is attached to the rotor shaft 24, one or more of the teeth 40 are positioned generally adjacent a shallow cutout or groove 44 formed in the rotor shaft 24. To further couple the collar 34 to the rotor shaft 24, the teeth 40 may be bent or deformed radially outwardly such that one or more of the teeth 40 are received within an aligned groove 44.

Figure 2:
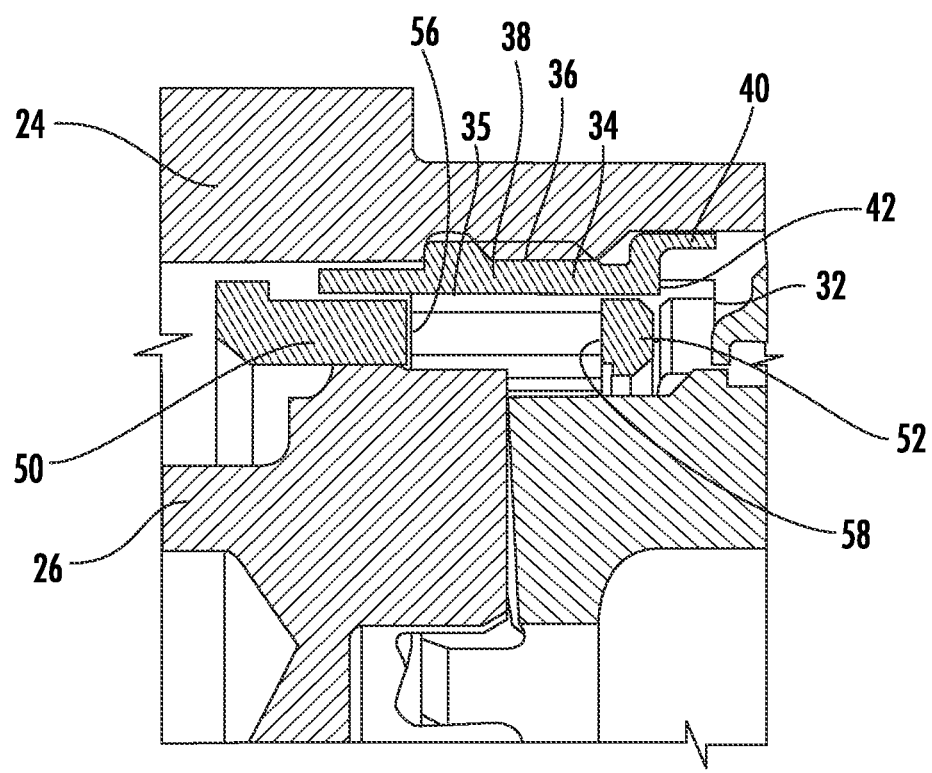
FIG. 2 is a detailed cross-sectional view of a vibration damping assembly arranged at an interface of a rotor shaft and a disconnect shaft of a generator according to an embodiment.
Figure 3:
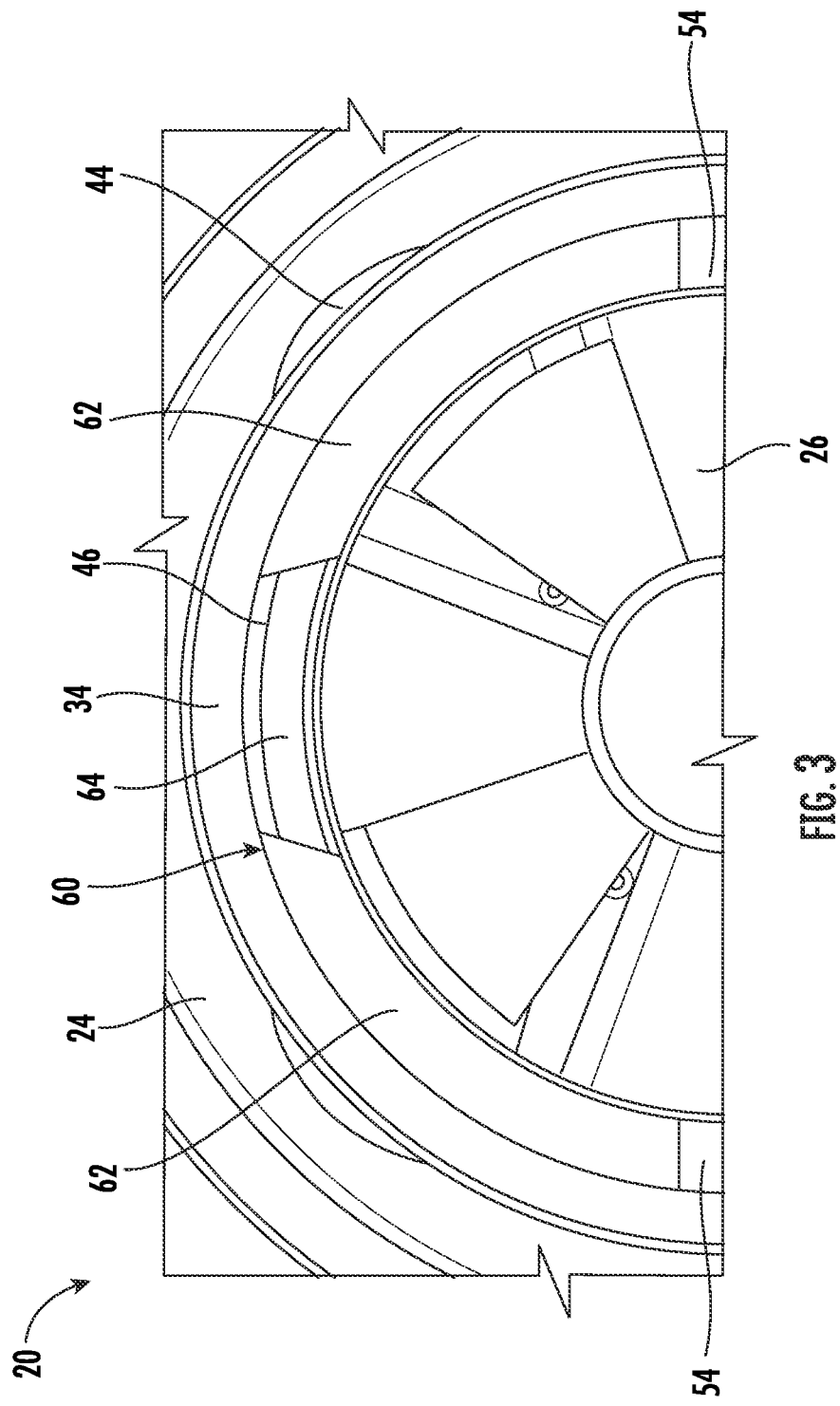
FIG. 3 is a front view of a portion of the interface of the rotor shaft and the disconnect shaft of FIG. 2 according to an embodiment.
Figure 4:
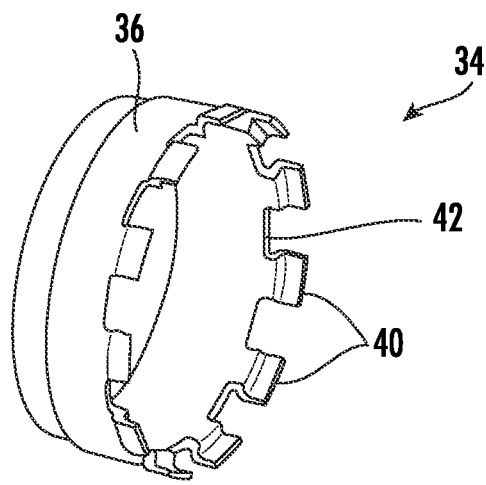
FIG. 4 is a perspective view of a collar of a vibration damping assembly according to an embodiment.
Figure 5:
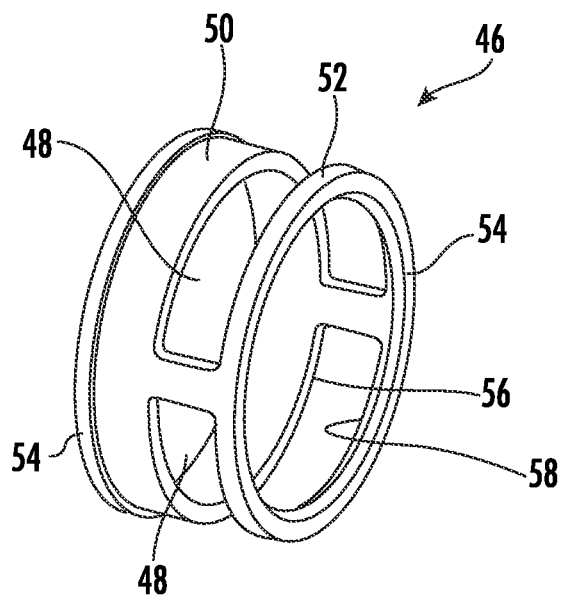
FIG. 5 is a perspective view of a cage of a vibration damping assembly according to an embodiment.
Figure 6:
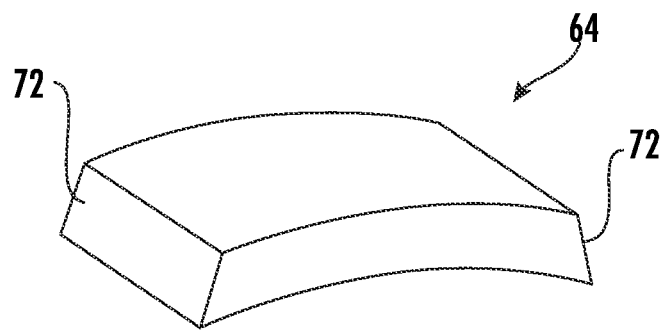
FIG. 6 is a perspective view of a support wedge of a damping mechanism of a vibration damping assembly according to an embodiment.
Figure 7:
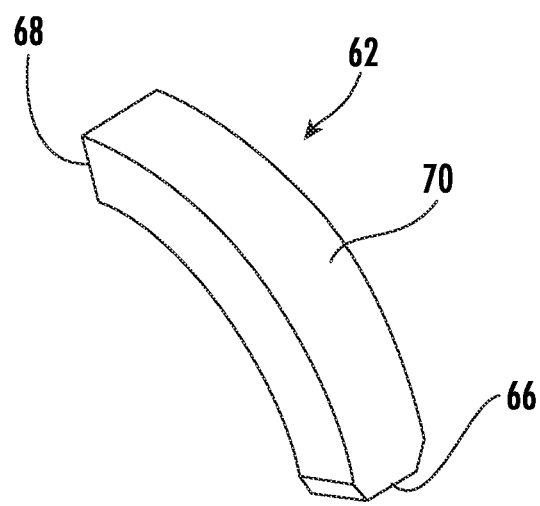
FIG. 7 is a perspective view of a flyweight of a damping mechanism of the vibration damping assembly according to an embodiment.

As best shown in FIGS. 2 and 5, the vibration damping assembly 32 includes a cage or flyweight holder 46 arranged about an outer periphery of the disconnect shaft 26 such that the cage 46 and the disconnect shaft 26 rotate in unison about axis X. Although the cage 46 is shown in the illustrated non-limiting embodiment as a component separable from the disconnect shaft 26, in other embodiments, the cage 46 may be integrally formed with the disconnect shaft 26. The cage 46 has at least one pocket or window 48 formed therein. In the illustrated embodiment, the cage 46 includes a first annular band 50 and a second annular band 52, both having an inner diameter slightly smaller than the outer diameter of the disconnect shaft 26 to facilitate and interference fit. Similarly, the first and second annular bands 50, 52 may have an outer diameter substantially equal or slightly smaller than the inner diameter of the collar 34. The first and second bands 50, 52 are axially spaced from one another such that a clearance is defined therebetween. The first and second annular bands 50, 52 are connected by at least one of more axial connectors 54 oriented generally parallel to the axis of rotation X of the disconnect shaft 26. Although the axial connectors 54 are illustrated as being connected to the end surfaces 56, 58 of the first and second bands 50, 52, embodiments where the axial connectors 54 are mounted to another surface, such as to the outer periphery of the bands 50, 52 for example, are also contemplated herein.

In the illustrated, non-limiting embodiment, the cage 46 includes two axial connectors 54 equidistantly spaced about the periphery of the cage 46. As a result, two substantially identical windows 48 are formed in the cage 46, each window 48 being defined between the ends 56, 58 of the first and second annular bands 50, 52 and a side of each axial connector 54. However, it should be understood that a cage 46 having only a single axial connector 54, and therefore a single window 48, or a cage 46 having more than two axial connectors 54, and therefore more than two windows 48 are also within the scope of the disclosure. Further, it should be understood that the axial connectors 54 may be arranged at any location about the periphery of the cage 46 such that in embodiments where the cage 46 includes a plurality of windows 48, the windows 48 may but need not be equal in circumferential length.

A damping mechanism 60 can be positioned within each window 48 of the cage 46. In embodiments of the vibration damping assembly 32 having multiple windows 48, the configuration of each the damping mechanism 60 positioned within a window 48 may be substantially the same, or may vary. As shown, the damping mechanism 60 is formed by a combination of one or more flyweights 62 and one or more support wedges 64. In the illustrated, non-limiting embodiment best shown in FIG. 3, the damping mechanism 60 includes a support wedge 64 arranged between two substantially identical flyweights 62. However, embodiments where the damping mechanism 60 includes another combination of flyweights 62 and support wedges 64, such as three flyweights 62 and two support wedges 64, with each support wedge 64 being interposed between a pair of flyweights 62 for example, are also contemplated herein.

When the damping mechanism 60 is installed within a window 48 of the cage 46, the outer ends 66 of the flyweights 62 are configured to abut a side surface of the axial connectors 54. Further, the ends 56, 58 of the annular bands 50,52 may be configured to restrict axial movement of the damping mechanism 60 when the vibration damping assembly 32 is stationary and rotating. As shown, the support wedge 64 is positioned between two flyweights 62 such that both of the ends 72 of the support wedge 64 are arranged in contact with the inner ends 68 of the flyweights 62. By positioning the support wedge 64 between the flyweights 62, the support wedge 64 is configured to apply a wedging force to the flyweights 62 to maintain the damping mechanism 60 in its position about the cage 46. Further, the disconnect shaft 26 may cooperate with the cage 46 to prevent inward movement of the damping mechanism 60. Accordingly, the damping mechanism 60 may be considered to loosely fit within the window 48 when the assembly is not rotating about the axis. However, at high speeds, the wedging force of the support wedge 64 pins the flyweights 62 in their position within the window 48. One or more parameters of the support wedge 64, such as the size of the support wedge 64 and the contact angle between the ends 72 of the support wedge 64 and the inner ends 68 of the flyweights 62 for example, may be controlled to achieve a desired wedging force.

Figure 8A:
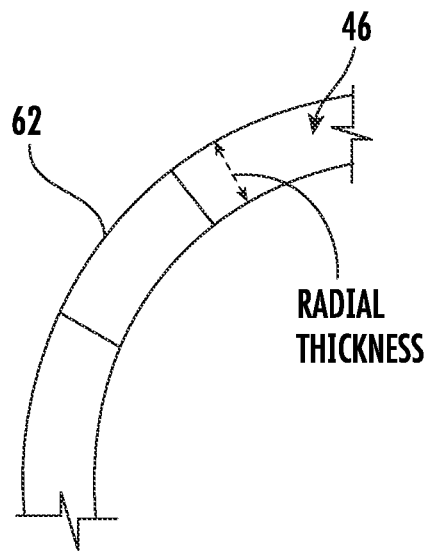
FIGS. 8A and 8B are partial cross-sectional views of the cage according to an embodiment.
Figure 8B:
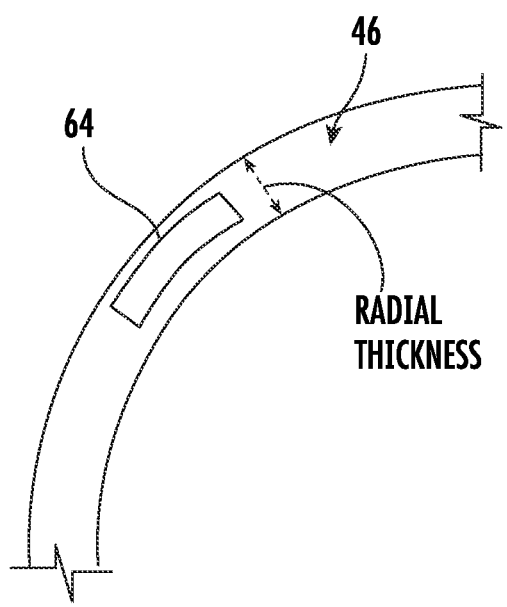
Figure 9:
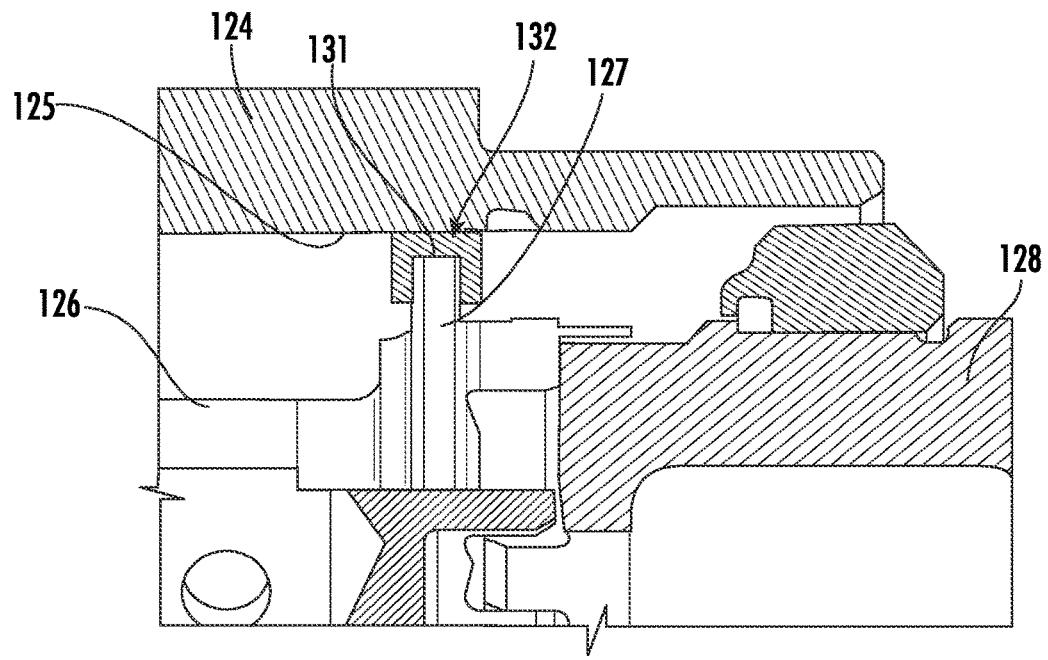
FIG. 9 is a detailed cross-sectional view of another vibration damping assembly according to an embodiment.
Figure 10:
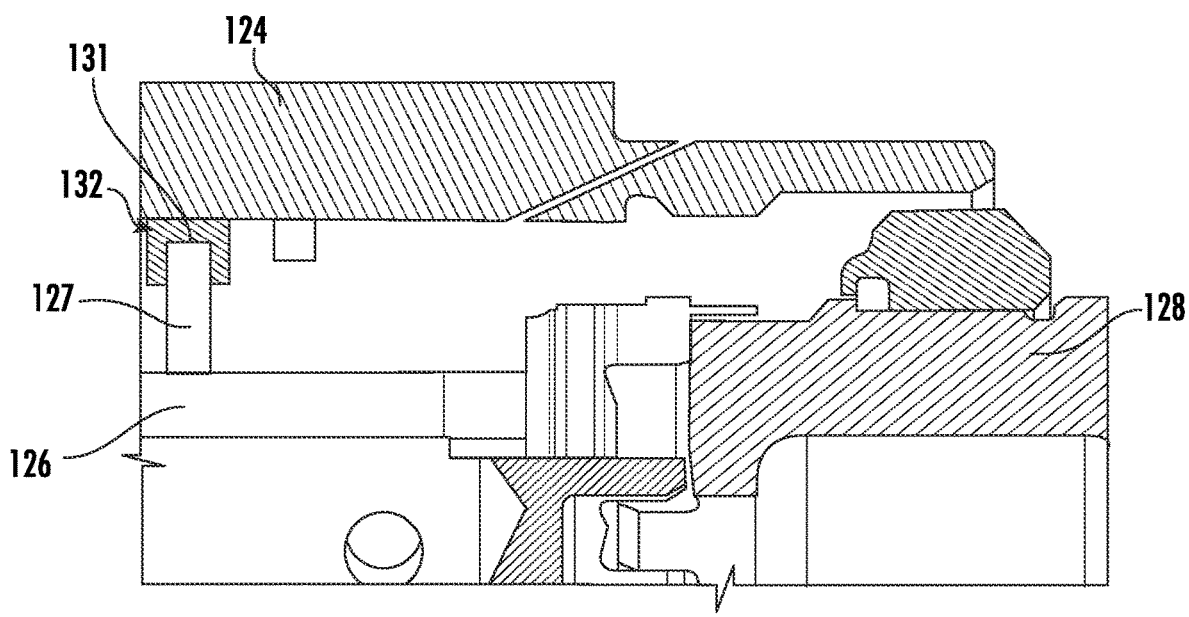
FIG. 10 is a detailed cross-sectional view of a vibration damping assembly according to another embodiment.

The radial thickness of each of the flyweights 62 within the damping mechanism 60 may be generally equal to the radial thickness of the first and second annular bands 50, 52 (see FIG. 8A). However, the radial thickness of the support wedge 64 may be less than the radial thickness of the flyweights 62 and annular bands 50, 52 (FIG. 8B). As a result, during normal operation of the vibration damping assembly 32, the flyweights 62, but not the one or more support wedges 64, are configured to contact the adjacent inner surface 35 of the collar 34.

During normal operation of the generator 20, the rotor shaft 24 and the disconnect shaft 26 are coupled to one another. As the shafts 24, 26, and therefore the concentrically positioned collar 34 and cage 46, rotate about the axis X, the centrifugal loads acting on the vibration damping assembly 32 push the one or more damping mechanisms 60 radially outward. Specifically, the centrifugal load pins the flyweights 62 against the collar 34 such that the radially outer surfaces 70 of the flyweights 62 engage and contact the adjacent surface 35 of the collar 34. As a result, any torsional vibration or oscillation of the rotor shaft 24 relative to the disconnect shaft 26 that occurs when the flyweights 62 are in this engaged position will cause the collar 34 to drag across the surface 70 of the flyweight 62. This movement of the collar 34 when the flyweights 62 are in contact with the collar 34 creates a frictional force in the direction opposite the direction of oscillation of the rotor shaft 24 that dampens the torsional vibration of the rotor shaft 24.

With reference now to FIGS. 9-12, a vibration damping assembly 132 according to another embodiment is illustrated. Similar to the previous embodiment, the vibration damping assembly 132 is arranged at a position between the rotor shaft 124 and the disconnect shaft 126 of a generator rotor. In the illustrated, non-limiting embodiment, the vibration damping assembly 132 is mountable to a flange 127 extending radially outwardly from a portion of the disconnect shaft 126. The flange 127 may be located near the end of the disconnect shaft 126 configured to cooperate with an adjacent input shaft 128 (see FIG. 9), or may be located at a central position of the disconnect shaft 126, spaced from the end configured to cooperate with the input shaft 128 (see FIG. 10).

One or more connectors 129 are coupled to or integrally formed with the flange 127. As shown, the connector 129 extends radially outwardly from an outer periphery 131 of the flange 127 such that a radius at the connector 129 is greater than the radius of the flange 127. In the illustrated, non-limiting embodiment, the flange 127 includes a first and second connector 129 spaced equidistantly about the periphery of the flange 127. As a result, two substantially identical damping sections or windows 148 are formed about the periphery of the flange 127 between the first and second connectors 129. However, it should be understood that a flange 127 having only a single connector, and therefore a single window, or a flange having more than two connectors, and therefore more than two windows are also within the scope of the disclosure. Further, it should be understood that the connectors 129 may be arranged at any location about the periphery of the flange such that in embodiments where the flange includes a plurality of connectors 129, the resulting windows 148 may but need not be equal in circumferential length.

A damping mechanism 160 can be positioned within each damping section or window 148 of the flange 127. In embodiments of the vibration damping assembly 132 having multiple windows 148, and therefore multiple damping mechanisms 160, the configuration of each damping mechanism 160 may be substantially the same, or may vary. Similar to the embodiment previously described, each damping mechanism 160 is formed by a combination of one or more flyweights 162 and one or more support wedges 164. In the illustrated, non-limiting embodiment best shown in FIG. 11, the damping mechanism 160 includes a support wedge 164 arranged between two substantially identical flyweights 162. However, embodiments where the damping mechanism 160 includes another combination of flyweights 162 and support wedges 164, such as three flyweights 162 and two support wedges 164, with each support wedge 164 being interposed between a pair of flyweights 162 for example, are also contemplated herein.

Figure 12:
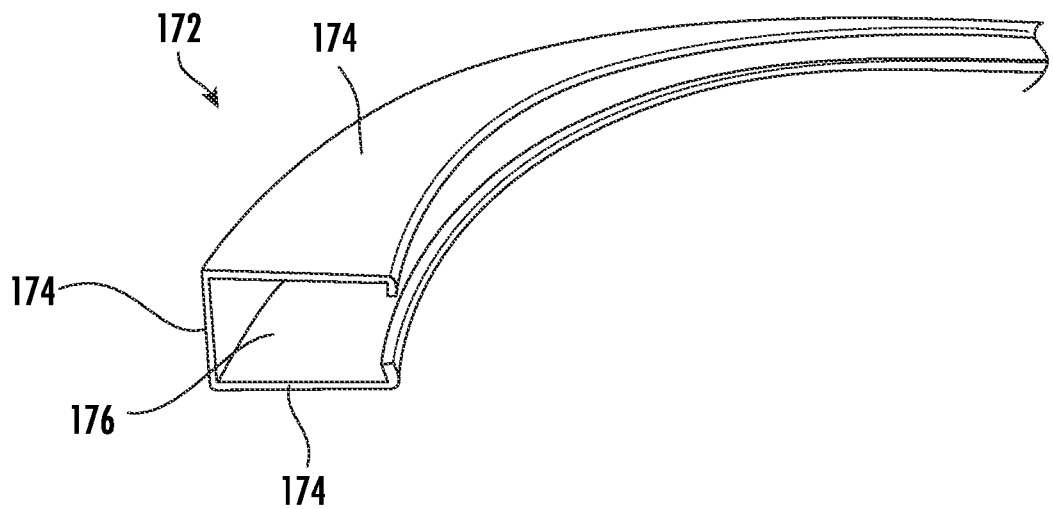
FIG. 12 is a perspective end view of an example of a flyweight of the vibration damping assembly according to an embodiment.

One or more of the flyweights 162 and the at least one support wedge 164 of the damping mechanism 160 has a channel-like configuration. With reference now to FIG. 12, an example of a flyweight 162 having a channel-like configuration is illustrated. As shown, the flyweight 162 has a generally arcuate contour complementary to the periphery of the flange 127. Further, the body of the flyweight 162 has a plurality of sides 174 arranged in a C or U-shaped configuration defining a hollow interior 176 therebetween. When the flyweight 162 is installed relative to the disconnect shaft 126, the outer periphery of the flange 127 is received within the hollow interior 176. In an embodiment, the size and shape of the hollow interior 176 is substantially equal to the size and shape of the outer periphery of the flange 127. Accordingly, the engagement between the sides of the flange 127 oriented substantially perpendicular to the rotational axis X and the adjacent sides 174 of the flyweight body restrict axial movement of the flyweight 162 relative to the flange 127. Although a flyweight 162 is illustrated and described herein as having a channel-like configuration, it should be understood that in other embodiments, the support wedge 164 may alternatively or additionally have a channel-like configuration.

Figure 11:
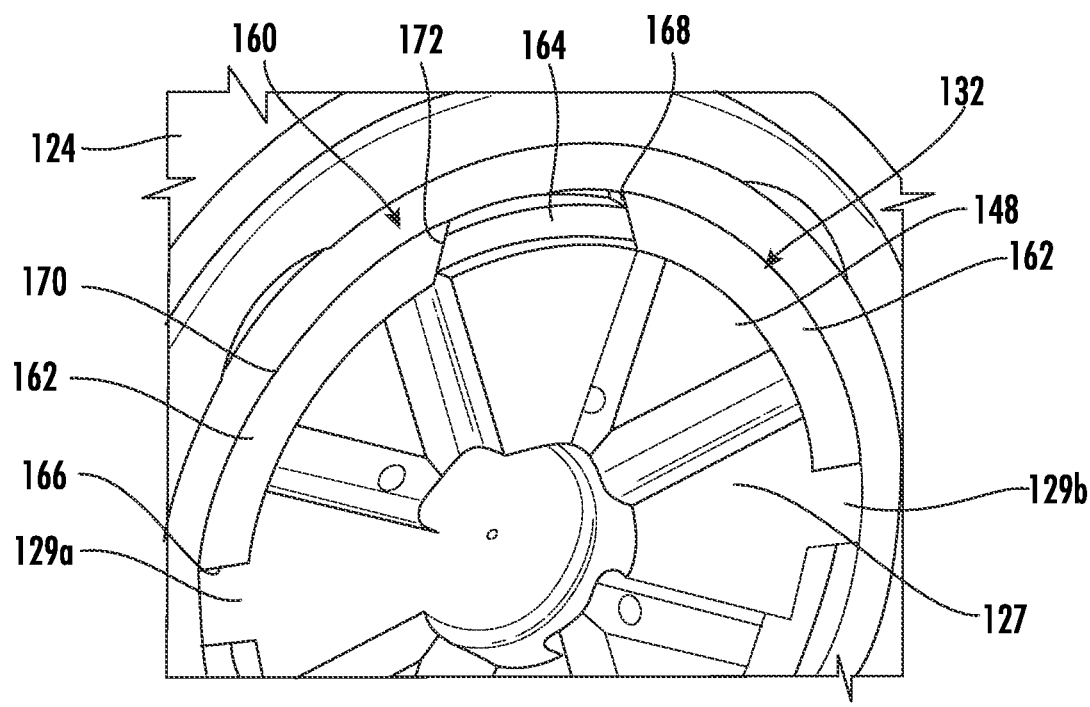
FIG. 11 is a perspective view of a portion of the vibration damping assembly according to an embodiment.

In the non-limiting embodiment of FIG. 11, the outer ends 166 of the flyweights 162 are configured to abut a side surface of the connectors 129. The support wedge 164 is positioned between the two flyweights 162 such that both of the ends 172 of the support wedge 164 are arranged in contact with the inner ends 168 of the flyweights 162. By positioning the support wedge 164 between the flyweights 162, the support wedge 164 is configured to apply a wedging force to the flyweights 162 to maintain the damping mechanism 160 in its position about the flange 127.

As the disconnect shaft 126 rotates at high speeds, the wedging force of the support wedge 164 pins the flyweights 162 in their position between the connectors 129. As previously described, one or more parameters of the support wedge 164, such as the size of the support wedge 164 and the contact angle between the ends 172 of the support wedge 164 and the inner ends 168 of the flyweights 162 for example, may be controlled to achieve a desired wedging force.

The radial thickness of the support wedge 164 may be less than the radial thickness of the flyweights 162. As a result, during normal operation of the vibration damping assembly 132, the flyweights 162, but not the one or more support wedges 164, are configured to contact an adjacent surface of the rotor shaft 124.

During normal operation, the shafts 124, 126 are coupled and rotate together about the axis X. The centrifugal loads acting on the vibration damping assembly 132 push the one or more damping mechanisms 160 radially outward. Specifically, the centrifugal load pins the flyweights 162 against the surface of the rotor shaft 124 such that the radially outer surfaces 170 of the flyweights 162 engage and contact the adjacent surface 125 of the rotor shaft 124. As a result, any torsional vibration or oscillation of the rotor shaft 124 relative to the disconnect shaft 126 that occurs when the flyweights 162 are in this engaged position creates a frictional force in the direction opposite the direction of oscillation of the rotor shaft 124 that dampens the torsional vibration of the rotor shaft 124. Although the flyweights 162 of the at least one damping mechanism 160 are configured to engage an adjacent surface of the rotor shaft 124, in other embodiments, a collar, similar to the collar described with respect to FIGS. 2-4 may be affixed to the rotor shaft 124, and the flyweights 162 may be configured to engage an adjacent surface of the collar.

Although the vibration damping assembly 32 is illustrated and described herein with respect to a generator 20, it should be understood that any component or application having two nested and rotationally coupled shafts, such as a motor, engine, or actuator for example, are also within the scope of the disclosure.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vibration damping assembly for use with a first shaft and a second shaft, the second shaft nested within an interior of the first shaft, the vibration damping assembly comprising:
    a collar rotatable with the first shaft;
    a cage rotatable with the second shaft and having at least one window formed therein, wherein the collar and the cage are mounted concentrically, the collar being rotatable relative to the cage; and
    at least one damping mechanism positioned within the at least one window, the at least one damping mechanism including a plurality of flyweights and at least one support wedge, the at least one support wedge being positioned between and in contact with the plurality of flyweights, wherein the plurality of flyweights are movable radially relative to the cage to frictionally engage an adjacent surface of the collar.

2. The vibration damping assembly of claim 1, wherein the at least one window is a plurality of windows.

3. The vibration damping assembly of claim 2, wherein a size and shape of each of the plurality of windows is identical.

4. The vibration damping assembly of claim 2, wherein the plurality of windows is equidistantly spaced about a periphery of the cage.

5. The vibration damping assembly of claim 1, wherein when the vibration damping assembly is stationary, the at least one damping mechanism is loosely mounted within the at least one window.

6. The vibration damping assembly of claim 1, wherein the plurality of flyweights includes a first flyweight and a second flyweight, and the at least one support wedge is interposed between the first flyweight and the second flyweight.

7. The vibration damping assembly of claim 1, wherein a radial thickness of at least one flyweight or plurality of flyweights is greater than a radial thickness of the at least one support wedge.

8. The vibration damping assembly of claim 1, wherein a radial thickness of at least one flyweight of the plurality of flyweights is equal to a radial thickness of the cage.

9. The vibration damping assembly of claim 1, wherein the cage further comprises:
   a first annular band;
   a second annular band axially spaced from the first annular band; and
   at least one axial connector connecting the first annular band and the second annular band.

10. The vibration damping assembly of claim 9, wherein the at least one window is defined between a first end surface of the first annular band, a second end surface of second annular band, and at least one side surface of the at least one axial connector.

11. A vibration damping assembly for use with a first shaft and a second shaft, the second shaft nested within an interior of the first shaft, the vibration damping assembly comprising:
   a collar rotatable with the first shaft;
   a cage rotatable with the second shaft and having at least one window formed therein, wherein the collar and the cage are mounted concentrically; and
   at least one damping mechanism positioned within the at least one window, the at least one damping mechanism including at least one flyweight and at least one support wedge, the at least one flyweight being movable relative to the cage to frictionally engage an adjacent surface of the collar, wherein a radial thickness of the at least one flyweight is equal to a radial thickness of the cage.

* * * * *